July 26, 1960 P. DEBOURDEAU 2,946,359
BLADES OF SAWS
Filed May 16, 1957
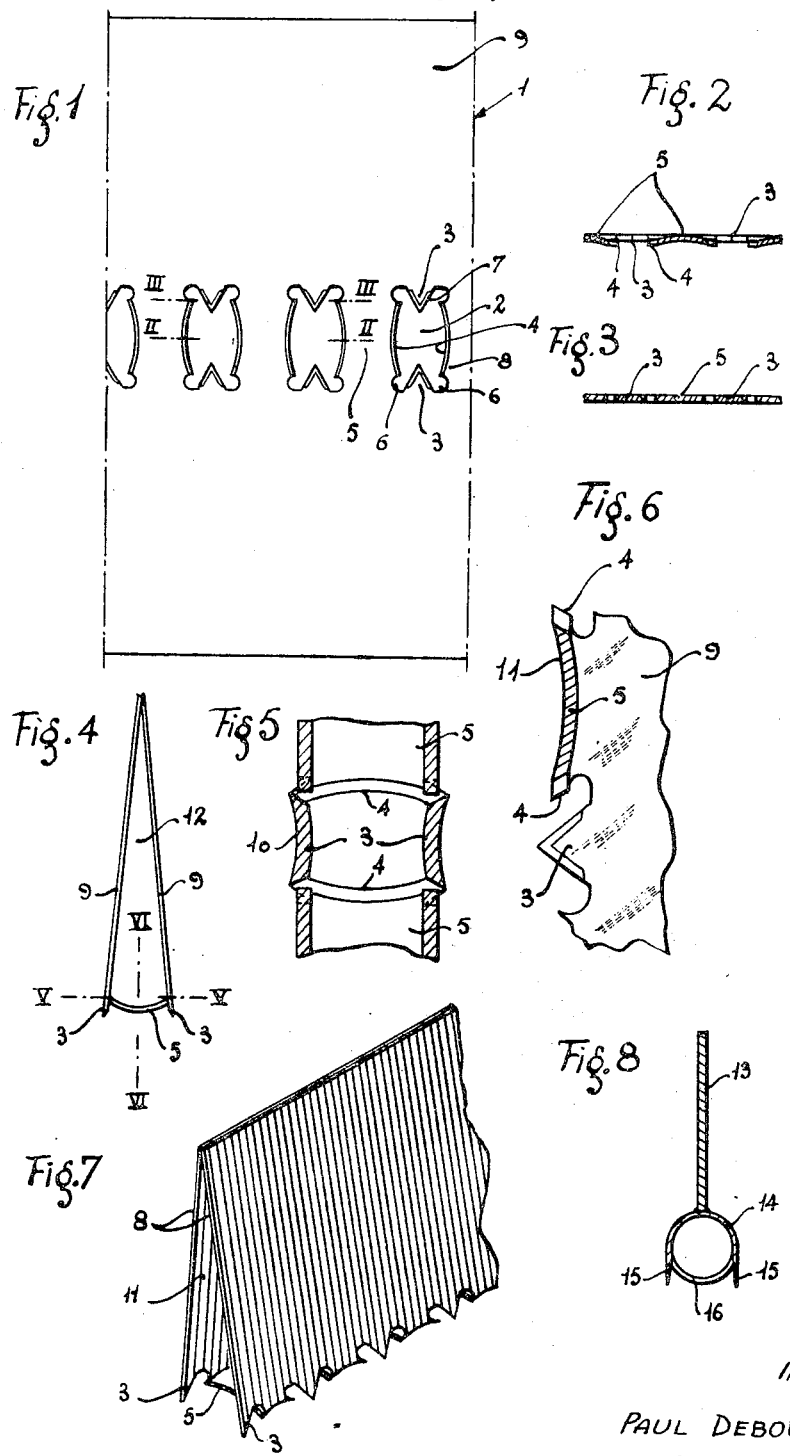
INVENTOR
PAUL DEBOURDEAU
By Irwin S. Thompson
ATTY.

United States Patent Office 2,946,359
Patented July 26, 1960

2,946,359

BLADES OF SAWS

Paul Debourdeau, 14 Rue Geoffroy-St. Hilaire,
Paris V°, France

Filed May 16, 1957, Ser. No. 659,575

3 Claims. (Cl. 143—133)

The blades of saws of the usual kinds are made from a flat strip of steel which is toothed along one of its edges. The teeth may have various forms, and a slight twisting of the teeth alternately in opposite directions provides the track required for the passage of the blade.

In order to carry out the sawing of a piece, the saw blade must be given an alternating movement having an amplitude such that every working tooth passes out of the said piece at the extremity of the sawing line, in order that the sawdust or cuttings may be evacuated from the slot cut by the saw. For this reason, when sawing pieces of large dimensions, for example in the case of a wood saw for cutting a tree trunk, the saw blade must be of considerable length, greater than twice the diameter of the tree, and the work of sawing is very arduous because of the amplitude of the necessary travel of the blade. When the saw is driven mechanically, this large sawing amplitude also necessitates a large radius for the eccentric device which converts the continuous movement of rotation of the driving shaft to a reciprocating motion.

The present invention has for its object a saw blade which is essentially characterised in that it is hollow, so as to form a channel having orifices along the teeth, so that the sawdust or cuttings pass into this channel and are evacuated through the interior of the blade.

In a preferred form of construction, the saw blade is formed by a strip of sheet steel, in which perforations are cut out along the half width, forming the saw teeth, the sheet being folded back on itself to form a triangle with a very acute angle in cross-section, the small base of which carries the said teeth and forms the sawing edge of the blade, the lateral convergent faces forming together the body of the saw and forming between them the evacuation channel for the sawdust or cuttings. The cutting-out of each perforation forms, on the sides parallel to the line of the perforation, teeth having a triangular outline, which, after the blade has been folded, form an extension of the lateral faces, and forms up to their clearances, the planing teeth on the two other sides of the perforation, these teeth of both types being bevelled and curved when so required, in order to give them the desired cutting and attack angles.

The invention will now be described in more detail below, reference being made to the accompanying drawings, in which:

Fig. 1 is a section of the length of a blade of sheet steel, developed and perforated so as to form after folding, a saw blade in accordance with the invention;

Fig. 2 is a local cross-section taken along the line II—II of Fig. 1;

Fig. 3 is a local cross-section taken along the line III—III of Fig. 1;

Fig. 4 is a transverse cross-section of the saw blade shown in Fig. 1 after folding;

Fig. 5 is a horizontal cross-section along the line V—V of Fig. 4;

Fig. 6 is a longitudinal cross-section taken along the line VI—VI of Fig. 4;

Fig. 7 is a perspective view of a portion of the same blade;

Fig. 8 shows in transverse cross-section, a further form of embodiment of a saw blade in accordance with the invention.

A saw blade in accordance with the invention is preferably formed from a strip of steel sheet 1 (Fig. 1) having a width slightly greater than twice that required for the finished saw blade. Along the central line of this strip, perforations 2 are stamped out with a contour such as to form teeth. On each of the sides parallel to the line of the perforations, the cutting out of a perforation forms a triangular tooth which projects into the interior of the perforation. The triangular teeth 3 are intended to form lateral working teeth when the sheet has been folded. The two other sides 4 of the cut-out portion may be straight or slightly concave towards the interior, and are intended to form, in the folded blade, the attack edges of planing teeth formed by the material left at 5 between the perforations. Round clearance holes 6 clearly separate the profiles of the teeth 3 and 5 and enable bevels 7 and 8 to be produced by grinding so as to give the tooth edges a suitable cutting angle. The teeth 3 and 5 may in addition be slightly curved during the stamping process so as to give their cutting edge the required angle of attack, as will be seen later.

The blade thus prepared is folded along two parallel longitudinal lines passing substantially at the extremities of the cutting edges 4 and passing through the teeth 3 along the line III—III of Fig. 1, but the folding action is only carried out on those parts of the blade between the perforations. After this folding operation, a hollow blade is obtained, the section of which, as shown in Fig. 4, has the form of a triangle with a very acute apex angle. In this section, the small base is formed by the teeth 3 and 5, and the sides 9 of the section are formed by the widths of sheet on each side of the perforations. The blade is then subjected to the usual heat treatment of tempering and annealing.

The hollow blade thus formed is triangular and rigid. The teeth 3 follow the sides of the strip during the folding operation and become located substantially in their extension. They thus occupy lateral positions; these are the working teeth. The teeth 5 on the other hand, which are formed by the space between the perforations, have their cutting edges 4 located in the space between the teeth 3 and form planing teeth in that space. There can especially be seen from Figs. 5 and 6 the curved portion 10 or 11, which can be given to the working teeth 3 as well as to the planing teeth 5, in order to give them the required angle of attack. There can also be seen in Fig. 6 that the working teeth 3 project slightly below the planing teeth 5.

When a blade of this kind is used, the working teeth, which project the most, are the first to attack the material to be sawn and cut lateral slots which form the track of the blade. The planing teeth 5 act in the space between. At every movement of the blade which deepens the said slots, they remove the material comprised between the slots. The blade cuts in both directions of its alternating movement, and the sawdust or the small shavings formed by the cutting teeth 3 and the planing teeth 5 are collected by the latter and pass through the perforations 2 into the channel 12 inside the saw. It is thus only necessary, when sawing, to ensure that the teeth carry out a reciprocating movement of quite small amplitude, at least greater than the pitch of the teeth.

The sawdust is eliminated from the internal channel of the blade, either by progression due to inertia or by blowing; in particular, in the case of a mechanical saw, the blowing may be effected for example by means of the exhaust gases of the engine which actuates the blade, when a petrol or similar engine is used for that purpose.

The hollow blade in accordance with the invention could, of course, be produced in other ways. Fig. 8 gives one example of this. The blade is formed by a strip of sheet steel 13 welded along a generator to a tube 14, in which cut-out portions form at the same time lateral working teeth 15 and planing teeth 16 intermediate between the two rows of working teeth. The shape of the teeth may be other than those which have been shown.

What I claim is:

1. A saw blade having a hollow transverse section forming a longitudinal passage along the whole length of said blade, two longitudinal cutting edges formed on said blade, said cutting edges being spaced apart in parallel longitudinal planes, and each cutting edge comprising a plurality of longitudinally disposed saw teeth, a plurality of transversely disposed planing teeth formed in the space between said saw teeth, and a plurality of orifices formed in said blade in the vicinity of said teeth, whereby the sawdust or cuttings pass into said passage and are evacuated through the interior of said saw blade.

2. A sheet metal saw blade having a hollow transverse section of triangular shape with a very small apex angle, a plurality of openings formed longitudinally in line in the narrow longitudinal face constituting the short base of said triangle, a plurality of working saw teeth formed by the contours of said openings, said teeth being located in two parallel longitudinal planes in the extension of each of the long sides of said triangle, and a plurality of planing teeth also formed by said contours, transversely in said longitudinal face in the spaces between said working teeth, whereby sawdust or cuttings are projected into said passage and are evacuated through the interior of said saw blade.

3. A saw blade comprising a flat metal strip fixed by one longitudinal edge along a generator line of a steel tube, a plurality of openings formed in line in said tube, with their axes along the diametrically opposite generator line of said tube, a double row of working saw teeth formed by the contours of said openings, the teeth of each said row being disposed tangentially to said tube and parallel to said strip, and a plurality of planing teeth also formed by said contours, transversely of said tube in the spaces between said working teeth, whereby sawdust or cuttings are projected into said tube and are evacuated through the interior of said tube.

References Cited in the file of this patent

UNITED STATES PATENTS

| | | |
|---|---|---|
| 907,167 | Neill | Dec. 22, 1908 |
| 1,286,465 | Whited et al. | Dec. 3, 1918 |
| 1,418,974 | Radow | June 6, 1922 |
| 1,483,387 | Serin | Feb. 12, 1924 |
| 1,689,618 | Brown | Oct. 30, 1928 |
| 1,710,142 | Berg | Apr. 23, 1929 |
| 1,902,177 | Mitchell | Mar. 21, 1933 |
| 2,143,063 | Fetterolf | Jan. 10, 1939 |
| 2,804,110 | Collins | Aug. 27, 1957 |

FOREIGN PATENTS

| | | |
|---|---|---|
| 26,986 | France | Dec. 26, 1923 |
| | (Addition to No. 532,069) | |
| 93,713 | Sweden | Dec. 7, 1938 |